Figure 1:
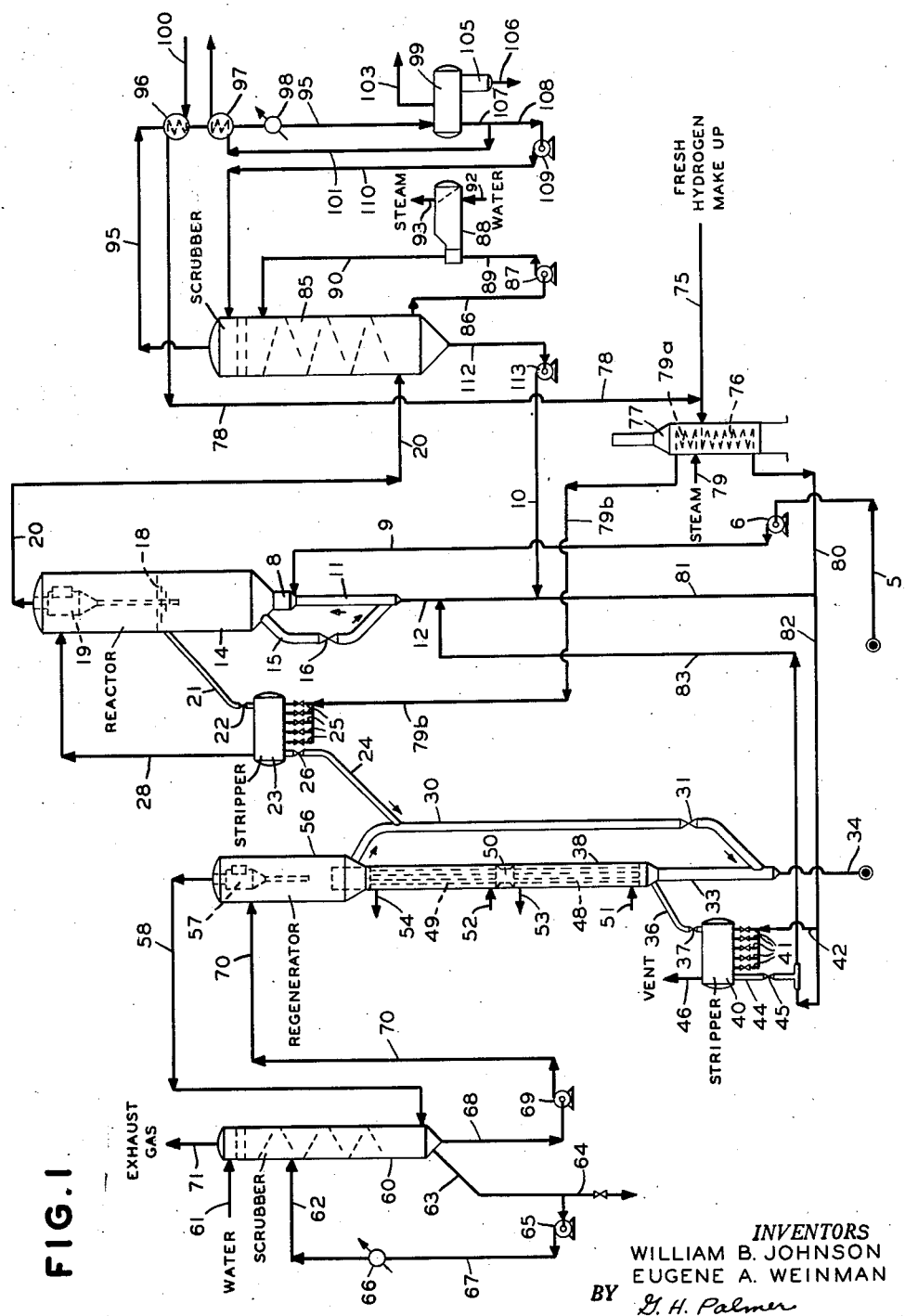

INVENTORS
WILLIAM B. JOHNSON
EUGENE A. WEINMAN
BY
G. H. Palmer
T. C. Virgil
ATTORNEYS

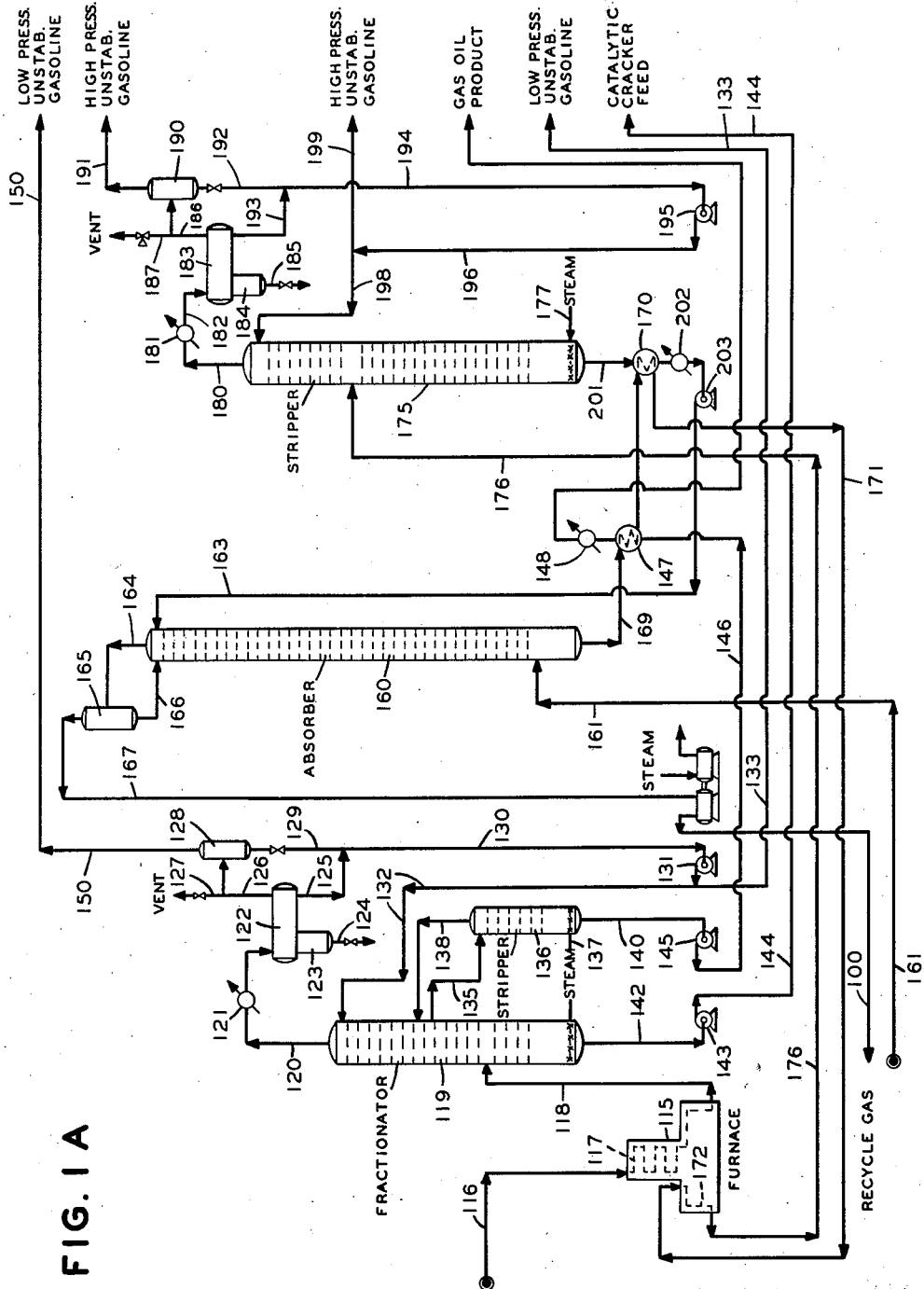

United States Patent Office 2,799,626
Patented July 16, 1957

2,799,626

TREATMENT OF RESIDUAL OILS

William B. Johnson, Far Hills, N. J., and Eugene A. Weinman, Forest Hills, N. Y., assignors to The M. W. Kellogg Company, Jersey City, N. J., a corporation of Delaware Application June 7, 1952, Serial No. 292,278

17 Claims. (Cl. 196—52)

This invention relates to improved method and means for converting hydrocarbons, and more particularly pertains to method and means for converting hydrocarbons in the presence of hydrogen.

The improvements of the present invention are adapted to a system wherein a mass of finely divided catalytic material is passed into a mixing zone into which there is also passing a second mass of finely divided catalytic material or recycle catalytic material. The total mass of fluid catalytic material is then contacted with a hydrocarbon material and the combined stream of materials then flows into a reaction zone wherein a fluidized mass of catalytic material is maintained for further contact with the hydrocarbon material.

In order to more fully understand the present invention, reference will be had to the accompanying drawings which form a part of this specification.

Figure 1 is a diagram of a fluid system for cracking a residual oil under hydrogen pressure; and Figure 1A is a diagram of the product recovery system for the process illustrated in Figure 1.

In Figure 1, a 24% reduced crude or residual oil is supplied from a source 5 at the rate of 8750 B. P. S. D. (barrels per stream day). This residual oil has a gravity of 18.5° API, a carbon residue of 8.6% by weight, an initial boiling point of 358° F., and begins to crack upon distillation at a temperature of 750° F., and when 30% by volume has been distilled. The residual oil has been preheated to a temperature of 750° F. by suitable means which are not shown in the drawing, and then is transported by means of pump 6 into the bottom part of a lower section 8 of the mixing zone by means of line 9. Prior to entering section 8 of the mixing zone, the residual oil is mixed with an oil slurry of catalyst fines which is introduced by means of line 10 into line 9. The slurry is mixed with the fresh residual oil at the rate of 175 B. P. S. D. The slurry has a specific gravity of 14° API and is at a temperature of about 810° F. In the mixing zone, the combined stream of residual oil and slurry is contacted with an upflowing stream of finely divided catalytic material, which in this example is silica-magnesia, and which contains 10% by weight of magnesia. The lower section 11 of the mixing zone is a vertical, cylindrical conduit having an internal diameter of 28 inches. Regenerated catalytic material is introduced into the bottom end of lower section 11 of the mixing zone via a line 12. An additional quantity of catalytic material is withdrawn from the bottom part of the reactor 14 and transferred to the bottom part of section 11 of the mixing zone by means of a standpipe 15. Standpipe 15 contains a slide valve 16 for automatically controlling the rate of flow of catalytic material from the bottom of the reactor 14 to the bottom of section 11 of the mixing zone.

Catalyst is recycled from the bottom of reactor 14 to the mixing zone by means of standpipe 15 at the rate of 500,000 pounds per hour. The catalyst is at a temperature of 900° F. and it serves to impart heat to the oil feed along with the upflowing regenerated catalytic material which is introduced via line 12 as well as maintain a desired ratio of catalyst to oil, on a weight basis, in section 11 of the mixing zone. For this purpose, the catalyst to oil ratio in the mixing zone should be in the range of about 2 to 20. The purpose for maintaining a high catalyst to oil ratio is that any fluid system should not have more than about 5 to 7% by weight of liquid wetting the catalyst, otherwise agglomeration may occur to a serious extent. In the case of processing residual oils this problem is serious, because, as in the present instance, the oil feed is in the liquid state and it is subjected to an elevated temperature for conversion to more useful products. When the oil feed contacts the catalyst, a substantial part thereof is vaporized and thus serves as a fluidization medium. In the event that a significant amount of the oil feed does not vaporize, the percentage of the liquid wetting the catalyst will be small by reason of the high circulation rate of catalyst through the mixing zone. Further, by circulating the catalyst through the mixing zone at a high rate, any tendency for excessive coking of residual oil to cause plugging of any part of the cross-sectional area of the mixing zone is counteracted. Thus, this process feature is important in the present invention, and serves as a particularly effective way of processing residual oils. In the present example, the catalyst to oil ratio in the mixing zone is 4.5:1. The regenerated catalyst is introduced through line 12 into section 11 of the mixing zone at the rate of 50,000 pounds per hour. The ratio of the weight quantity of recycle catalyst which is withdrawn from the bottom of reactor 14 and passed into the mixing zone via standpipe 15 to the quantity of regenerated catalyst flowing from line 12 is 10:1. This ratio, termed for convenience in the present invention as the "catalyst recycle ratio," can be in the range of about 3 to 30:1. As indicated above, the recycle catalyst serves the dual function of preventing excessive wetting of catalyst in the mixing zone and of furnishing heat to the residual oil which is contacted in the upper section 8 of the mixing zone. The linear velocity of the fluidized mass of catalyst passing through section 11 of the mixing zone is 20 feet per second in this example. This velocity can be varied in the range of from about 5 to about 70 feet per second. The upper section 8 of the mixing zone is superimposed by the reactor 14, which is a vertical, cylindrical vessel having an internal diameter of 4 feet and a length of 42 feet. A dense fluidized mass of catalyst is maintained in the reactor and it has a level 18. As a result of mixing the residual oil and the oil slurry of catalyst fines with the fluid mass of upflowing catalytic material from the mixing zone, the hydrocarbon material is vaporized and then cracked to desired products. The residence time of the total oil feed can be varied in the range of from about 3 to about 75 seconds. As a result of conversion of the hydrocarbon material, a reaction product is formed which contains a variety of products boiling within a wide range of temperatures.

The reaction product is first disengaged from the catalyst material and then passed into a cyclone 19 which is located in the upper part of reaction vessel 14. A substantial part of the catalyst fines which are entrained in the product stream is removed by means of the cyclone 19. The product stream then passes overhead from the reactor 14 by means of an outlet line 20. The pressure in the upper part of the reactor is maintained at 630 p. s. i. a. This pressure can vary from about 50 to 3000 p. s. i. a. As a result of hydrocarbon conversion in the reactor 14, there is deposited on the catalyst a carbonaceous material which causes temporarily the loss of catalyst activity. In order to revivify or regenerate the catalyst, it is first continuously withdrawn from the top part of the fluid bed in the reactor by means of a standpipe 21. This standpipe has an internal diameter of 6 inches and contains in the bottom part thereof a slide valve 22 for automatically controlling the rate of withdrawal of catalyst from the reactor. The fluid bed of catalyst in the reactor is maintained at a fluid density of 25 pounds per cubic foot. This density can be varied from about 8 to about 55 pounds per cubic foot. In comparison, the density of the catalyst in standpipe 21 is 40 pounds per cubic foot, and it can be varied in the range of about 25 to about 80 pounds per cubic foot. The spent catalyst has a carbon content of 16.3% by weight. The catalyst flows from the standpipe 21 into stripper 23 which is a horizontal, cylindrical vessel having an internal diameter of 6 feet and a length of 10 feet. The catalyst is introduced into the top of the stripper at one end of the vessel, and withdrawn therefrom at the opposite end from the bottom side by means of a standpipe 24. The catalyst in the stripper is contacted with steam which is introduced into the bottom side of the stripper by means of five spaced valved lines 25. The temperature of the stripper is maintained at 900° F. Steam is introduced into the stripper at the rate of 5200 pounds per hour. As a result of contacting the catalyst with steam in the stripper, some of the occluded and/or sorbed hydrocarbon material in the catalyst is removed. The rate of stripping fluid can be varied in the range of from about 0.02 to about 2 pounds per pound of catalyst. In this example, the stripping fluid is steam, however, it can also be a hydrogen-containing gas, nitrogen, carbon dioxide, flue gas, etc. The rate of catalyst withdrawal from the stripper in standpipe 24 is automatically controlled by means of slide valve 26 which is located in the upper part of the standpipe. The stripping gas and any hydrocarbon material which is removed from the catalyst is passed from the overhead of the stripper into the top part of reactor 14 by means of an outlet 28 which is connected to the top side of the reactor opposite to the position of standpipe 24. The temperature in the stripper can be varied over the range of from about 700° to about 1150° F. The density of the catalyst in the stripper is 30 pounds per cubic foot in this example. This fluid density can be varied over a range of from about 15 to about 60 pounds per cubic foot. The pressure can be varied over the range of from about 50 to about 3000 p. s. i. a. It is to be noted from the description of the stripper that the catalytic material being subjected to such a treatment is present as a shallow, horizontal, fluid bed in stripper 23. The stripping fluid is passed upwardly across the length of the bed in a manner which insures reasonably uniform contact time between the catalyst and the stripping fluid, e. g., steam. Furthermore, the use of shallow beds of catalyst in contact with several fresh streams of stripping streams of stripping fluid being injected along the length thereof effects a faster rate of stripping by reason that stripping fluid laden with hydrocarbon material is not in contact with the catalyst for any long period of time. In the case of processing residual oils, it is important to have the best stripping operation which is possible, because the coke yeld for such an operation is normally high. Effective stripping lowers the regeneration requirements, which, in the case of hydrocracking residual oils, is an expensive operation. Another feature of the stripping system in the present invention which is unusually applicable to processing high coke producing operations, is that the catalytic mass just before entering the stripper is in a fluidized state and the fluid state is substantially disrupted as the material is flowing into the stripping zone. The disruption of the fluid mass is beneficial, because upon again becoming fluidized as a shallow, horizontal bed, a great deal of the hydrocarbon material which is occluded in the incoming stream of spent catalyst is removed.

The fluid mass leaves the stripper at the rate of 50,000 pounds per hour of catalyst containing 8420 pounds of coke and 1040 pounds per hour of steam. This total stream flows into the regenerator recycle catalyst standpipe 30 which has an internal diameter of 24 inches. In the standpipe 30, catalyst is flowing downwardly at the rate of 1,073,000 pounds per hour and this catalyst also contains 8420 pounds of coke. Prior to introducing the catalyst from the stripper into standpipe 30, the catalyst flowing downwardly in the standpipe is at a temperature of 750° F. A large stream of recycle catalyst is employed in order to avoid excessive rises in temperature due to burning the carbonaceous deposits on the catalytic material in the combustion zone. In this example, the ratio of the amount of low temperature recycle catalyst to the amount of catalyst which is introduced into the standpipe 30 from the stripper is 21:1. This recycle ratio can be termed for convenience in the present invention as the "regeneration recycle ratio," and it can vary in the range of from about 5 to 50:1. The recycle catalyst rate is controlled automatically by means of a slide valve 31 which is situated in the bottom part of the regenerator recycle catalyst standpipe 30. The linear velocity of the fluid mass of catalyst flowing downwardly in standpipe 30 is 2.5 feet per second in this example. This velocity can be varied from about 0.5 to about 7 feet per second. The fluid density of the catalyst flowing in the standpipe 30 is 34 pounds per cubic foot, in this example. This fluid density can be varied over the range of from about 10 to about 50 pounds per cubic foot.

Standpipe 30 is connected to the bottom part of a high velocity regenerator 33. This regenerator 33 has an internal diameter of 3 feet 4 inches and a length of 23 feet. At the bottom end of regenerator 33, air is introduced at a temperature of 345° F., and at a pressure of 630 p. s. i. a., at a rate of 110,890 pounds per hour through line 34. The amount of air or oxygen-containing gas which is introduced into the regenerator can be varied from about 8 to about 20 pounds of air or an equivalent amount of oxygen per pound of coke which is deposited on the catalyst. The fluid density of the upflowing liquid mass in the high velocity regenerator 33 is 15 pounds per cubic foot. This density can vary from about 8 to about 30 pounds per cubic foot. The linear velocity of the upflowing liquid mass in the regenerator is 5 feet per second. This velocity can be varied over a wide range including a velocity of about 2 to about 20 feet per second. It is desirable to maintain the velocity in the regenerator at such a rate that a dense phase of fluidized mass of catalyst is maintained therein. This provides a more intimate contact between the catalytic particles and the regeneration gas, and further, it makes possible a more rapid rate of heat transfer from those particles which contain burning carbonaceous material and those particles which have been recycled and contain very little or no carbonaceous material deposited thereon. Although a lean phase of catalyst can be used in the regenerator of this invention, it does not provide as rapid a rate of heat exchange as is possible in the case of a dense phase. The temperature in the regenerator is 1050° F. This temperature can vary over the range of about 600° to about 1250° F., although a temperature of 950° to about 1150° F. is preferred.

At the temperature existing in the regenerator, catalyst is withdrawn from the top of the regenerator through a standpipe 36. The rate of withdrawal of catalyst is automatically controlled by means of a slide valve 37 which is located in the bottom part of standpipe 36. The catalyst is withdrawn from the regenerator at the rate of 50,000 pounds per hour. This catalyst contains a carbonaceous deposit of 0.2% by weight. The carbonaceous content of the catalyst can be varied over a wide range, for example, about 0.01 to about 30% by weight. In some instances, it is not desirable to attempt to regenerate the catalyst to a zero percent content of carbonaceous material. More usually, however, the catalyst leaving the regenerator may contain a carbonaceous content of about 0.1 to about 1% by weight. It is advantageous to withdraw the catalyst from the regenerator directly rather than have it passed through the cooling section 38 which is superimposed on the regenerator. It is necessary to supply heat for the conversion of the residual oil which takes place in the reactor. This heat may be furnished at least in part by the heat of combustion which is generated in the high velocity regenerator 33. Consequently, part of the hot regenerated catalyst leaves the regenerator bed and enters the end of the regenerated catalyst stripper 40 at the top side via standpipe 36. The regenerated catalyst stripper is a horizontal, cylindrical vessel having an internal diameter of 6 feet and a length of 10 feet. Stripping gas, which in this example is a hydrogen-containing gas, is introduced at a plurality of points in the bottom side of the stripper through valved lines 41. This hydrogen-containing gas is supplied from a source 42. In the stripper, the temperature is at 1070° F., although it may vary in the range of from about 800° to about 1200° F. The regenerated catalyst is stripped in order to remove any oxygen which may be adsorbed or occluded thereon. The fluid density of the catalyst in the stripper is 30 pounds per cubic foot and this density can be varied by controlling the amounts of stripping gas which are introduced via lines 41 at the bottom side thereof. This density can be varied from about 15 to about 60 pounds per cubic foot. Catalyst is withdrawn from stripper 40 by means of a standpipe 44 which is situated at the end opposite to the standpipe 36 and is connected to the bottom side thereof. Standpipe 44 contains a slide valve 45 for automatically controlling the rate of flow of catalyst from the stripper 40. The stripping gas and any stripped products are removed overhead from the stripper via a vent line 46.

At the top of regenerator 33, from which catalyst is withdrawn through standpipe 36, the temperature is 1050° F. This represents the temperature of combustion in regenerator 33. A large amount of the catalyst leaving the regenerator is passed upwardly into a cooling section 38 which is composed of two separate and superposed units 48 and 49. Each unit contains a plurality of vertical tubes through which the catalyst flows in its upward passage. Between the cooling units 48 and 49, there is a section 50 of reduced cross-sectional area which serves the purpose of increasing the linear velocity of the upflowing fluid mass, and thereby tends to prevent catalyst from refluxing or flowing back from unit 49 to unit 48. This reduced section 50 is considered somewhat important because of the improved results in cooling efficiency obtained therefrom. Generally, the linear velocity of the catalyst mass in section 50 is about 2 to 6 times as great as that in unit 48, however, in this example, the linear velocity is 20 feet per second. In unit 48, the linear velocity of the upflowing mass of catalytic material is 5 feet per second. This linear velocity can be varied from about 2 to about 20 feet per second, and from the standpoint of heat transfer rate, it is desirable to maintain a high linear velocity of catalyst through both cooling units 48 and 49. The linear velocity of the total mass flowing upwardly through cooling unit 49 is 5 feet per second. This velocity can be varied from about 2 to about 30 feet per second, and in relation to the linear velocity in the cooling unit 48, it should be about the same or greater. Cooling is effected in units 48 and 49 by introducing water through inlets 51 and 52. As a result of indirectly cooling the upflowing catalyst mass in units 48 and 49, a portion of the water is vaporized to steam, and hence, the mixture of water and steam is discharged from the top parts of units 48 and 49 through lines 53 and 54, respectively. As a result of passing water through cooler 38, the catalyst temperature is decreased to 750° F. Generally, the catalyst can be cooled to a temperature of from about 600° to about 900° F., depending upon the temperature of regeneration, as well as the amount of cooling which is required from the circulation of cooled catalyst.

Cooling section 38 is superimposed by a disengaging vessel 56 which has an internal diameter of 9 feet and a length of 25 feet. Within the top part of the disengaging vessel 56, there is situated a cyclone 57 for the purpose of removing any entrained catalyst fines in the outgoing flue gas. The flue gas is then removed overhead from the disengaging vessel 56 by means of an outlet 58. While a substantial part of the catalyst fines in the outgoing flue gas is removed by means of cyclone 57, catalyst fines are removed from the system in the flue gas at the rate of 352 pounds per hour of catalyst fines. The outgoing flue gas is a stream comprised of 19,310 pounds per hour of flue gas and 5860 pounds per hour of steam. In order to recover the catalyst fines in the flue gas, scrubber 60 is employed which has an internal diameter of 6 feet and a length of 21.5 feet. At the top part of the scrubber 60, water is fed at the rate of 1500 gallons per hour through line 61. Below the fresh water inlet 61, recycle water is introduced via line 62 at the rate of 62,600 gallons per hour. The flue gas flows upwardly and in countercurrent contact with the downflowing water. As a result, the entrained catalyst fines are removed by the water. A portion of the water in the bottom of the scrubber 60 is withdrawn through a line 63 for the purpose of cooling and recirculating same. However, about 2470 gallons per hour of the water is discharged from the system by means of a line 64. The remainder of the water is transported by means of pump 65, through a cooler 66 via a line 67 and back to the top part of the scrubber. Cooler 66 removes 26,135,000 B. t. u. per hour. As a result, the temperature in the top of the scrubber is 100° F.; whereas the temperature in the bottom of the scrubber is 150° F. The pressure in the scrubber is maintained at 580 p. s. i. a. From the bottom of the scrubber, line 68 serves to withdraw the water slurry of catalyst fines for the purpose of recycling same by means of pump 69 and line 70 to the top part of disengaging vessel 56 of the regenerator system at the rate of 704 gallons per hour of water, containing 352 pounds of catalyst fines. Flue gas which has been water-scrubbed is removed overhead from the scrubber through vent line 71.

Fresh make-up hydrogen is supplied via line 75 at the rate of 148,190 S. c. f. per hour (standard cubic feet "S. c. f." measured at 60° F. and 760 mm.). The hydrogen is at a temperature of 70° F. and a pressure of 660 p. s. i. before being introduced into coil 76 of the furnace 77. A recycle gas stream from line 78 is combined with the fresh make-up hydrogen and the combined stream is charged to furnace 77. In the furnace 77, the temperature of the hydrogen-containing gas stream is raised to 1165° F. In the upper part of furnace 77, steam is fed into a coil 79a from a source 79 at the rate of 5200 pounds per hour. The steam is heated in the furnace to a temperature of 900° F., and then it is passed through line 79b for distribution to lines 25 to serve as stripping gas. The hydrogen-containing gas stream which is heated in furnace 77 is passed through line 80, and thence it is divided so that a portion thereof, about 20%, passes through line 81, which in turn is connected to line 12, which leads to the bottom of section 11 of the mixing zone. The remaining portion of the hydrogen-containing gas, except for that amount which passes through line 42 and is used as a stripping gas in stripper 40, serves to carry the regenerated catalyst which is discharged from standpipe 44 of the regenerated catalyst stripper to the mixing zone. Accordingly, the regenerated catalyst is picked up by means of the hydrogen-containing gas in line 82, and it is carried through lines 83 and 12 before entering the bottom of section 11 of the mixing zone.

The reaction product which leaves the top of the reactor through line 20 is at a temperature of 900° F. The product is in a vapor state, and it is charged to the bottom of a reactor scrubber tower 85, which is provided with suitable baffles for effecting intimate contact between a downflowing condensed high boiling hydrocarbon fraction and the upflowing product vapors. The temperature in the bottom of the scrubbing tower 85 is 810° F., and the pressure in the tower is at 620 p. s. i. a. Under these conditions, a high boiling liquid fraction is produced which serves to scrub any catalyst fines which are present in the product vapor entering the scrubbing tower. In the bottom of the scrubber tower 85, the high boiling fraction is permitted to settle in order that the upper liquid can become less concentrated with catalyst fines. This oil can be decanted and thence removed from the tower by means of line 86. The decanted liquid fraction is transported by means of pump 87 to a slurry boiler 88 through line 89. In the slurry boiler, heat is removed from the decanted oil fraction and the resultant temperature is 825° F. The decanted liquid is withdrawn from the scrubber tower at the rate of 358,000 pounds per hour. This material has a specific gravity of 14° API. After the liquid fraction has been cooled by means of the slurry boiler 88, it is returned to the top of scrubber tower 85 by means of line 90. Water serves as the cooling medium for the slurry boiler 88, and it is supplied by means of line 92. As a result of the heat exchange in the slurry boiler, part of the water is converted to steam, viz., at the rate of 16,320 pounds per hour. The cooling medium is vented from the system through an overhead line 93. As a result of employing the cooled liquid fraction in the scrubber tower 88, the incoming product vapors are stripped of substantial amounts of catalyst fines and there is a condensation of more liquid products boiling in substantially the same range as the cooled oil fraction. The product vapors, denuded of high boiling liquid products and substantial amounts of catalyst fines, are removed overhead from the scrubber tower through a line 95. These product vapors first pass through heat exchangers 96 and 97, and thence through cooler 98, before passing to a recycle gas flash drum 99.

In the heat exchanger 96, the product vapors are first cooled by indirect heat exchange with the recycle gas which is fed from the product recovery system through a line 100. The recycle gas flows through line 78 before combining with the fresh make-up hydrogen in line 75. The combined stream is heated in furnace 77. The second heat exchanger 97 contains cooled liquid product from flash drum 99 for indirect exchange of heat with the product stream from scrubber 85. The cooled liquid product from the flash drum is introduced via line 101, and it is earmarked for passage to the product recovery system which is to be discussed hereinafter in connection with Figure 1A. In the flash drum 99, the temperature is 100° F.; whereas the pressure is 600 p. s. i. a. By means of an overhead line 103 which is connected to the top of drum 99, hydrogen and some hydrocarbons are removed overhead for passage to the product recovery system. Attached to the bottom side of flash drum 99, there is a water trap 105 which provides for the removal of condensed water, which is present in the incoming product stream. Water is discharged from trap 105 by means of line 106. This water is discharged at the rate of 4154 pounds per hour. The liquid product in the flash drum 99 is withdrawn by means of a bottom line 107. As previously mentioned, a portion of the liquid product is passed through line 101 for indirect heat exchange with product vapors passing through line 95. The remaining portion of the liquid product, which has a specific gravity of 34° API, is recycled to the top of the scrubber tower 85 at the rate of 3000 pounds per hour. The recycle liquid is passed through line 108, and it is transported to the top of the scrubber by means of pump 109 and line 110. That portion of the liquid product which is transported to the product recovery system is supplied at the rate of 99,389 pounds per hour. In the bottom of the scrubber 85, the high boiling liquid product containing a slurry of catalyst fines is withdrawn by means of a bottom line 112. The oil slurry is transported by means of a pump 113 through line 10, by which the oil slurry first combines with the fresh residual oil in line 9 before being fed into section 8 of the mixing zone.

In Figure 1A, the liquid product in line 101 of Figure 1 is charged to a furnace 115 by means of line 116. The liquid contains a specific gravity of 33.2° API and a temperature of 500° F. This liquid product is passed through a coil 117 of furnace 115, wherein the temperature is raised to 625° F. The vaporized product is discharged from the furnace 15 at a rate of 48,300 pounds per hour and then it is fed through line 118 into a fractionating column 119. The temperature at the top of the fractionator is maintained at 350° F. and in the bottom of the fractionator the temperature is 560° F. The tower is held at a pressure of 30 p. s. i. a. Under these conditions, an overhead vapor is produced at the rate of 68,420 pounds per hour, and has a molecular weight of 105. The overhead product is discharged from the fractionator through a line 120, and it is first condensed in cooler 121 prior to passing to an accumulator 122. The accumulator is provided with a trap 123 for the removal of condensed water in the overhead product. The condensed water is removed at the rate of 2975 pounds per hour through a valved line 124. The condensed product liquid in accumulator 122 is removed therefrom by means of a bottom line 125. The normally gaseous product material is removed from the accumulator through an overhead line 126. A portion of the gaseous product is vented through line 127; whereas the remainder passes to a liquid separating drum 128. Any liquid which is entrained in the gas stream settles to the bottom of the separating drum 128 and is removed therefrom through a valved line 129. The combined liquid streams passing through lines 125 and 129 are joined as a single stream in line 130. This combined stream, after being pressured in pump 131, is divided so that 44,900 pounds per hour are recycled to the top of fractionator 119 via a recycle line 132. The remainder of the liquid product passes through a line 133 at the rate of 22,450 pounds per hour for storage. This product is a low pressure unstabilized gasoline which has a specific gravity of 74.4° API. Just above the middle of the fractionating column, a liquid fraction at a temperature of 525° F. is withdrawn through a line 135 and then it is passed to the top of a stripper 136. In the stripper, steam is fed into the bottom thereof at the rate of 1000 pounds per hour through a line 137 for the purpose of stripping gasoline components therefrom. The stripped material is removed from the stripper by means of an overhead line 138, which is connected to the fractionating tower 119 just above the position of line 135. The liquid product which has been stripped of more volatile components is removed from stripper 136 by means of a bottom line 140.

From the bottom of the fractionator 119, a liquid product is removed by means of a line 142, and it is transported by means of pump 143 to storage via a line 144. This material is a gas oil which has a specific gravity of 21.1° API, and it can be used as feed in a catalytic cracking operation. This bottom product is removed from the fractionator at the rate of 50,031 pounds per hour. The stripped product which is discharged from the bottom of the stripper via line 140 is transported to storage by means of pump 145 and line 146. Before passing to storage, the stripped product flows through a heat exchanger 147 and then a cooler 148. This stripped product is a light gas oil having a specific gravity of 28° API. It is produced in the system at the rate of 285,810 pounds per hour. The normally gaseous material which is present in separating drum 128 of the fractionating system is removed by means of an overhead line 150. This gaseous product is a low pressure unstabilized gas having a molecular weight of 30.6. It is discharged from separating drum 128 at the rate of 1028 pounds per hour and contains 25 pounds of steam.

The recycle gas which is discharged from flash drum 99 in Figure 1 is fed into the bottom of an absorber 160 via a feed line 161. This recycle gas is fed to the absorber at the rate of 46,514 pounds per hour, and without steam, it has a molecular weight of 7.64. The steam which is present in the recycle stream amounts to 170 pounds when fed at the rate indicated. To the top of the absorber 160, a liquid hydrocarbon oil having a specific gravity of 28° API is fed at the rate of 414,000 pounds per hour through line 163. The recycle gas passes upwardly and in countercurrent contact with the downflowing oil and thereby hydrocarbons having 2 to as high as 10 carbon atoms are removed from the gas stream. The stripped gas passes overhead from the absorber 160 through a line 164, and thence flows into a separating drum 165. Any entrained liquid in the gas is removed in the separating drum, and then it is recycled to the top of the absorber by means of a line 166. The stripped gas in the separating drum 165 is discharged therefrom by means of an overhead line 167, and it is passed to heat exchanger 96 via line 100 in Figure 1. The enriched oil in the absorber 160 passes therefrom through a valved line 169. The absorber is operated at a top temperature of 100° F., a bottom temperature of 110° F. and a pressure of 595 p. s. i. a. The enriched oil in line 169 is first passed through a heat exchanger 147, by which the temperature is raised to 120° F., and then through a second heat exchanger 170 before passing via line 171 into coil 172 of furnace 115. As a result of heating in furnace 115, the enriched oil attains a temperature of 540° F. and it is charged into a rich oil stripper 175 by means of line 176. In the rich oil stripper 175, the top temperature is maintained at 300° F., the bottom temperature is maintained at 505° F. and at a pressure of 75 p. s. i. a. Steam is introduced into the bottom of the rich oil stripper through a line 179 at the rate of 75,906 pounds per hour. As a result of the conditions in the rich oil stripper, raw gasoline product having a molecular weight of 68 is yielded overhead through a line 180 at the rate of 85,889 pounds per hour. The raw gasoline product is first cooled to condense a substantial part of the material in a cooler 181, and then it is passed by means of line 182 into an accumulator 183. The accumulator contains a water trap 184 whereby condensed water is discharged through a valved line 185 at the rate of 35,818 pounds per hour. The gaseous material is discharged overhead from the accumulator through a line 186. A portion of the gas is vented through a valved line 187; whereas the remainder is passed to a separating drum 190. Any entrained liquid in the gas is separated in the drum, and the gas is discharged overhead through a line 191. The gas product is a high pressure unstabilized gas having a molecular weight of 24.5. This gas is produced at the rate of 1139 pounds per hour. The separated liquid in drum 190 is discharged therefrom through a valved line 192. This liquid combines with the liquid in line 193. The combined liquid product from lines 192 and 193 pass through a line 194, and by means of pump 195, this product is first passed through a line 196, and thence it is divided so that a portion, i. e., at the rate of 43,950 pounds per hour, is recycled to the top of the rich oil stripper by means of a line 198. The remainder of the liquid product is passed to storage via line 199 at the rate of 550 pounds per hour. This liquid product has a specific gravity of 73° API and is a high pressure unstabilized gasoline. The stripped oil in the rich oil stripper is discharged from the bottom thereof through a line 201. This denuded oil first passes through a heat exchanger 170, and then it passes through a cooler 202. After it is cooled, it is transported by means of pump 203 to the top of absorber 160 by means of line 163.

Cracking under hydrogen pressure of hydrocarbon oil is conducted, generally, at a temperature of about 750 to about 1050° F. and at a pressure of about 100 to about 2500 p. s. i. a. In the reaction zone the hydrogen partial pressure is generally about 85 to about 2000 p. s. i. a., and thus usually corresponds to a hydrogen rate of about 1000 to about 25,000 s. c. f. b. (standard cubic feet measured at 60° F. and 760 mm.) per barrel of oil feed (1 barrel equals 42 gallons). The relationship of the oil rate to the amount of catalyst which is present in the reaction zone is customarily called the weight space velocity and is measured as the pounds of oil feed per hour per pound of catalyst in the reaction zone. Generally, cracking under hydrogen pressure of hydrocarbon oils is conducted at weight space velocities in the order of about 0.1 to about 10. In a moving bed system, the circulating catalyst rate and the oil feed rate are usually expressed as the catalyst to oil ratio, on a weight basis. In this respect, in hydrocracking, the catalyst to oil ratio is usually about 0.05 to 20:1.

In the example described above, silica-magnesia was employed as the catalytic material. In the present invention, the catalytic material can include a variety of different types of catalyst. For example, the catalyst can include silica, silica-alumina, silica-zirconia, silica-thoria, "Superfiltrol," fuller's earth, kieselguhr, pumice, etc., which are generally known as cracking catalysts. The catalytic material may also comprise a combination of a cracking component and a hydrogenating component. Generally, the hydrogenating component can include, for example, thoria, manganese oxide, tungsten oxide, molybdenum oxide, chromium oxide, platinum, the sulfides and oxides of copper, iron and cobalt, etc. In silica-containing catalysts, the silica usually comprises about 50 to about 95% by weight. In those instances where the combination of a hydrogenating component and a cracking component is employed as a catalytic material, the hydrogenating component constitutes about 0.001 to about 15% by weight of the total catalyst.

The present invention has been illustrated with respect to cracking under hydrogen pressure of a residual oil. It should be understood, however, that the improved method and means of this invention can be applied generally for hydrocarbon conversion, including catalytic cracking, reforming, etc., as well as such operations as hydrodesulfurization, hydrogenation, isomerization, dehydrogenation, aromatization, hydrocarbon synthesis, etc.

Having thus provided a description of this invention along with specific illustrations thereof, it should be understood that no undue limitations or restrictions are to be imposed by reason thereof, but that the scope of the present invention is defined by the appended claims.

We claim:

1. A chemical conversion process which comprises passing a hot mass of finely divided solid material suspended in hydrogen-containing gas into a mixing zone, passing a second mass of hot finely divided solid material into said mixing zone in a quantity such that the combined masses of solids and gaseous material has a linear velocity of about 5 to about 70 feet per second, introducing liquid hydrocarbon material into the upper part of said mixing zone in a quantity such that the solid to oil ratio is about 2 to 20:1 and whereby at least a substantial part of the hydrocarbon material is vaporized and agglomeration of solids due to wetting thereof is substantially avoided, passing the solids and vaporized hydrocarbon into a reaction zone wherein is maintained a dense fluidized bed of solids for further contact with the hydrocarbon vapor, separating the reaction product thus produced from the solids, and recycling a portion of the solids to the mixing zone as the second mass of solids.

2. A chemical conversion process which comprises passing a hot mass of finely divided solid material into a mixing zone, passing a second mass of hot recycle finely divided solids into said mixing zone such that the recycle ratio is about 3 to 30:1, introducing liquid hydrocarbon material into the upper part of said mixing zone in a quantity such that the solid to oil ratio is about 2 to 20:1 and whereby at least a substantial part of the hydrocarbon material is vaporized and agglomeration of solids due to wetting thereof is substantially avoided, passing the solids and vaporized hydrocarbon into a reaction zone wherein is maintained a dense fluidized bed of solids for further contact with the hydrocarbon vapor, separating the reaction product thus produced from the solids and recycling a portion of the solids to the mixing zone as the second mass of solids.

3. A process for converting a residual oil to gasoline of high anti-knock quality which comprises circulating a hot regenerated mass of finely divided silica-magnesia catalyst as a suspension in a hydrogen-containing gas into a reactor mixing zone, passing a second mass of hot finely divided silica-magnesia catalyst into said mixing zone, introducing liquid residual oil into said mixing zone in a quantity relative to the total mass of hot finely divided silica-magnesia that a substantial part of the oil is vaporized and agglomeration of catalyst by wetting is substantially avoided, passing the entire mass of catalyst and oil vapors into a reaction zone wherein is present a dense fluidized mass of finely divided silica-magnesia catalyst, separating the reaction product thus produced from the catalyst and discharging it from the reaction zone, circulating a portion of the mass of catalyst in the reaction zone to the mixing zone as the aforesaid second mass of catalyst, withdrawing another portion of catalyst containing carbonaceous material from the reaction zone and passing it to a reactor stripping zone wherein the catalyst forms a shallow horizontal fluidized bed and is contacted with steam to strip therefrom hydrocarbon material, passing the stripped catalyst into a regenerator mixing zone wherein it is mixed with a mass of regenerated silica-magnesia catalyst at a lower temperature, flowing the mixture of catalyst into a regeneration zone wherein it is contacted with an oxygen-containing gas under burning conditions to remove a substantial part of the carbonaceous material therefrom, withdrawing a portion of regenerated catalyst from the regeneration zone and passing same to a cooling zone, recirculating the cooled regenerated catalyst to the aforesaid regenerator mixing zone, passing the other portion of regenerated catalyst from the regeneration zone to a regenerated catalyst stripper wherein the catalyst forms a shallow horizontal fluidized bed and is contacted with hydrogen-containing gas to strip therefrom oxygen-containing gas and passing the stripped regenerated catalyst as a suspension in hydrogen-containing gas to the aforesaid reactor mixing zone.

4. A chemical conversion process which comprises passing a hot mass of finely divided solid material into a reactor mixing zone, passing a second mass of hot finely divided solid material into said mixing zone, introducing a liquid hydrocarbon into said mixing zone, the quantity of hot solids present in said mixing zone being sufficient to vaporize at least a substantial part of the liquid hydrocarbon and substantially avoid the agglomeration of solids due to wetting, passing the solid material and vaporized hydrocarbon from the mixing zone to a reaction zone wherein a fluidized mass of finely divided solid material is maintained at an elevated temperature for further contact with said vaporized hydrocarbon whereby desirable products are produced and the solids become contaminated with carbonaceous material, separating the product material thus obtained from the finely divided solid material and discharging same from the reaction zone, passing a portion of the finely divided solid material from the reaction zone directly to the aforesaid mixing zone as the aforesaid second mass of solids, withdrawing a portion of the finely divided solid material contaminated with carbonaceous material from the reaction zone and passing same to a regenerator mixing zone wherein it is combined with a cooled mass of finely divided solid material, introducing the combined mass of finely divided solids from the regenerator mixing zone to a regeneration zone wherein it is contacted with an oxygen-containing gas for the burning of carbonaceous material, passing a portion of the finely divided solid material of reduced carbonaceous content from the regeneration zone to a cooling zone wherein the temperature is reduced prior to flowing to the regenerator mixing zone, and passing another portion of solid material of reduced carbonaceous content from the regeneration zone to the aforesaid reactor mixing zone.

5. A chemical conversion process which comprises passing a hot mass of finely divided solid material into a reactor mixing zone, passing a second mass of hot finely divided solid material into said mixing zone, introducing a liquid hydrocarbon into said mixing zone, the quantity of hot solids present being sufficient to vaporize at least a substantial part of the liquid hydrocarbon and substantially avoid an agglomeration of solids due to wetting, passing the solid material and vaporized hydrocarbon into a reaction zone wherein a fluidized mass of finely divided solid material is maintained at an elevated temperature for further contact with said vaporized hydrocarbon whereby desirable products are produced and the solid material becomes contaminated with carbonaceous material, separating the product material thus produced from the finely divided solid material and discharging same from the reaction zone, passing a portion of the finely divided solid material from the reaction zone to the aforesaid mixing zone as the aforesaid second mass, withdrawing a portion of the finely divided solid material contaminated with carbonaceous material from the reaction zone to a regenerator mixing zone wherein it is combined with a cooled mass of finely divided solid material, introducing the combined mass of finely divided solids thus obtained into a regeneration zone wherein it is contacted with an oxygen-containing gas for the burning of carbonaceous material, passing a portion of the finely divided solid material of reduced carbonaceous content to a first vertical elongated cooling zone wherein the temperature of the solids is decreased, passing the solids thus cooled from the first cooling zone through a zone of reduced cross-sectional area wherein the linear velocity of the flowing solid material is about 2 to about 6 times as great as the flow rate in the first cooling zone in order to substantially avoid refluxing of finely divided solid material to the first cooling zone, passing the cooled solids from the zone of reduced cross-sectional area to a second elevated elongated cooling zone wherein the solids are further cooled, passing the cooled regenerated solids to the regenerator mixing zone in order to reduce the temperature of the incoming solid material from the aforesaid reaction zone, and passing a portion of the hot regenerated solid material from the regeneration zone to the aforesaid reactor mixing zone for the purpose of vaporizing liquid hydrocarbon which is flowing therein.

6. A chemical conversion process which comprises passing a hot mass of regenerated finely divided solid material into a reactor mixing zone, passing a second mass of hot finely divided solid material into said mixing zone in order to increase the linear velocity of materials flowing through said mixing zone, introducing a liquid hydrocarbon into said mixing zone, the quantity of hot solids present in said mixing zone being sufficient to vaporize at least a substantial part of the liquid hydrocarbon and substantially avoid the agglomeration of solids due to wetting, passing the solid material and vaporized hydrocarbon from the mixing zone to a reaction zone wherein a fluidized mass of finely divided solid material is maintained at an elevated temperature for further contact with said vaporized hydrocarbon whereby desirable products are produced and the solids become contaminated with carbonaceous material, separating the product material thus obtained from the finely divided solid material and discharging same from the reaction zone, passing a portion of the finely divided solids from the reaction zone to the aforesaid mixing zone as the aforesaid second mass, withdrawing a portion of the finely divided solid material contaminated with carbonaceous material from the reaction zone and passing same to a regenerator mixing zone wherein it is combined with a cooled mass of regenerated finely divided solid material, the relative quantities of solids providing a regeneration recycle ratio of about 5 to about 50:1, introducing the combined mass of finely divided solids from the regenerator mixing zone to a regeneration zone wherein it is contacted with a oxygen-containing gas for the burning of carbonaceous material, passing a portion of the finely divided solid material of reduced carbonaceous content from the regeneration zone to a cooling zone wherein the temperature is reduced prior to entering the regenerator mixing zone, and passing another portion of solid material of reduced carbonaceous content from the regeneration zone to the aforesaid reactor mixing zone.

7. A chemical conversion process which comprises passing a suspension of hot finely divided catalytic material in a hydrogen-containing gas into a reactor mixing zone, passing a second portion of fluidized finely divided catalytic material into said mixing zone in order to increase the linear velocity of the materials flowing therethrough, introducing a liquid hydrocarbon into said mixing zone, the quantity of hot catalyst present in the mixing zone being sufficient to vaporize at least a substantial part of the liquid hydrocarbon and substantially avoid the agglomeration of catalyst due to wetting, passing the catalyst and the gaseous material from the mixing zone to a reaction zone wherein a fluidized mass of finely divided catalytic material at an elevated temperature is maintained for further contact with the gaseous materials in order to produce desirable products and thereby obtain carbonaceous material deposited on the catalyst, separating the product material thus obtained from the finely divided catalyst and discharging the product from the reaction zone, withdrawing a portion of the fluidized catalyst in the reaction zone and passing the same to the aforesaid reactor mixing zone as the aforesaid second mass of catalyst, withdrawing a portion of the fluidized catalyst from the reaction zone and passing the same to a stripping zone wherein the fluidized character of the flowing catalyst is first substantially disrupted and then forms a horizontal shallow fluidized bed of catalytic material for contact with the stripping gas in order to remove any product materials therefrom, passing the stripped catalyst to a regenerator mixing zone wherein it is combined with a cooled mass of finely divided regenerator catalyst in order to lower the temperature of the stripped solids, introducing the combined mass of finely divided catalyst from the regenerator mixing zone to a regeneration zone wherein it is contacted with an oxygen-containing gas for burning of carbonaceous material, passing a portion of the regenerated finely divided catalytic material from the regeneration zone to a cooling zone wherein the temperature is reduced prior to flowing to the regenerator mixing zone, withdrawing a portion of fluidized catalyst from the regenerator zone and passing the same to a stripping zone wherein the fluidized character of the catalyst is first substantially disrupted and then the catalyst forms a horizontal shallow fluidized bed for contact with a stripping gas for the removal of any oxygen or flue gas contained therein, and then passing the stripped regenerated catalyst as a suspension in a hydrogen-containing gas to the aforesaid reactor mixing zone.

8. A chemical conversion process wherein a vaporous hydrocarbon reactant is contacted with a fluidized mass of finely divided solid contact material in a reaction zone under conditions suitable for the conversion of said hydrocarbon and thereby contaminating the solid material with a carbonaceous deposit and a portion of contaminated solids is withdrawn from the reaction zone and subjected to combustion conditions in a separate regeneration zone for the removal of at least part of the carbonaceous deposits, the improvement which comprises contacting liquid hydrocarbon feed with a hot mass of regenerated solids from the regeneration zone and a hot mass of contaminated solids in a mixing zone at a temperature and in a quantity such that the solids are wetted below the point at which there is a substantial tendency for agglomeration to occur and at least a substantial portion of the liquid feed is vaporized, passing the vaporized feed and solids to the reaction zone, and recycling a portion of contaminated solids from the reaction zone to the mixing zone.

9. The process of claim 8 wherein the liquid hydrocarbon is a residual oil.

10. A chemical conversion process wherein a vaporous hydrocarbon reactant is contacted with a fluidized mass of finely divided solid contact material in a reaction zone under conditions suitable for the conversion of said hydrocarbon and thereby contaminating the solid material with a carbonaceous deposit and a portion of contaminated solids is withdrawn from the reaction zone and subjected to combustion conditions in a separate regeneration zone for the removal of at least part of the carbonaceous deposits, the improvement which comprises passing a portion of regenerated solids from the regeneration zone to a mixing zone, passing a portion of contaminated solids from the reaction zone to a mixing zone, the ratio of contaminated solids to regenerated solids being about 3 to 30:1, introducing liquid residual oil into said mixing zone in a quantity such that the solids to oil ratio is about 2 to 20:1, such that a substantial part of the residual oil is vaporized and the solids are wetted with residual oil to a concentration below the point at which there is a substantial tendency for agglomeration to occur, and passing the vaporized residual oil and solids to the reaction zone.

11. A chemical conversion process wherein a vaporous hydrocarbon reactant is contacted with a fluidized mass of finely divided solid contact material in a reaction zone under conditions suitable for the conversion of said hydrocarbon and thereby contaminating the solid material with a carbonaceous deposit and a portion of contaminated solids is withdrawn from the reaction zone and subjected to combustion conditions in a separate regeneration zone for the removal of at least part of the carbonaceous deposits, the improvement which comprises passing a portion of regenerated solids to a mixing zone, passing a portion of contaminated solids from the reaction zone to the mixing zone, the ratio of contaminated solids to regenerated solids being about 3 to 30:1, introducing a liquid residual oil into the mixing zone in a quantity such that the solids to oil ratio is about 2 to 20:1, and whereby a substantial part of the residual oil is vaporized and the liquid concentration on the solids is below the point at which there is a substantial tendency for agglomeration to occur, passing the vaporized residual oil and solids through the mixing zone at a superficial linear gas velocity of about 5 to about 70 feet per second, and passing the vaporized residual oil and solids from the mixing zone to the reaction zone.

12. A cracking process wherein a vaporous hydrocarbon reactant is contacted with a fluidized mass of finely divided solid cracking catalyst in a reaction zone in the presence of hydrogen and under conditions suitable for the conversion of said hydrocarbon and thereby contaminating the catalyst with a carbonaceous deposit and a portion of the contaminated catalyst is withdrawn from the reaction zone and passed to a regeneration zone wherein the catalyst is subjected to combustion condition for the removal of at least part of the carbonaceous deposit, the improvement which comprises passing a portion of regenerated catalyst to a mixing zone, passing a portion of contaminated catalyst from the reaction zone to the mixing zone, the ratio of contaminated catalyst to regenerated catalyst being about 3 to 30:1, passing a hydrogen containing gas to the mixing zone, passing a liquid residual oil to the mixing zone in a quantity such that the catalyst to oil ratio is about 2 to 20:1, and whereby a substantial part of the residual oil is vaporized and the liquid concentration of the catalyst is not more than about 5 to 7% by weight, passing the entire mixture of catalyst and gasiform material through the mixing zone at a superficial linear gas velocity of about 5 to about 70 feet per second, and passing the materials flowing through the mixing zone to the reaction zone.

13. A fluid system which comprises a reaction means adapted to contain a fluidized mass of finely divided solids, a mixing means connected to the lower portion of said reaction means and being in open communication therewith such that the latter receives finely divided solids from the former, a liquid inlet means for introducing liquid feed into said mixing means, additional means connecting the bottom part of said reactor means with the mixing means whereby finely divided solids are transferred from the former to the latter, and inlet means for introducing finely divided solids to said mixing means below the point of entry of said liquid inlet means.

14. A fluid system which comprises a reaction means adapted to contain a fluidized mass of finely divided solids, a mixing means associated with said reaction means such that the latter receives finely divided solids from the former, a liquid inlet means for introducing liquid feed into said mixing means, means connecting the bottom part of said reactor means with the mixing means whereby finely divided solids are transferred from the former to the latter, inlet means for introducing finely divided solids to said mixing means below the point of entry of said liquid inlet means, regeneration means suitable for the removal of carbonaceous material from the finely divided solids by means of oxidation, cooling means adapted to receive a portion of solids from the regeneration means and cool the same, a hopper means adapted to receive the cooled solids from the cooling means, means for transferring cooled solids from the hopper means to the regeneration means, means for transferring solids from the reaction means to the means whereby solids are transferred from the hopper means to the regeneration means, and means for withdrawing solids from the regeneration means.

15. A fluid system which comprises a vertical cylindrical reactor adapted to contain a fluidized mass of finely divided solids, a vertical cylindrical mixing conduit connected to the bottom of said reactor and being in open communication therewith, a liquid inlet means whereby liquid feed is introduced into said mixing conduit, a cylindrical elongated conduit connecting the bottom of said reactor with the bottom part of said mixing conduit such that the solids flow from the reactor to the conduit, and an inlet means for introducing finely divided solids to the mixing conduit below the point of entry of said liquid feed from an external source.

16. A fluid system which comprises a vertical cylindrical reactor adapted to contain a fluidized mass of finely divided solids, a vertical cylindrical mixing conduit having its upper end connected to the bottom part of said reactor and being in open communication therewith, a liquid inlet means whereby liquid feed is introduced into said mixing conduit, an elongated cylindrical conduit having its upper end connected to the bottom part of the reactor and its bottom end connected to the bottom part of the mixing conduit such that solids flow from the reactor to the mixing conduit, inlet means for introducing finely divided solids into the mixing conduit below the point of entry of the liquid feed from a source to be described hereafter, a vertical cylindrical regenerator adapted to contain a fluidized mass of finely divided solids, cooling means superimposed on said regenerator and adapted to receive a portion of solids from said regenerator for the purpose of cooling the same, a vertical cylindrical hopper superimposed on said cooling means and adapted to receive cooled solids therefrom, an elongated cylindrical conduit connecting the hopper with the bottom part of the regenerator such that solids flow from the hopper to the regenerator, means for transferring solids from the regenerator to the elongated conduit connecting the hopper to the regenerator, and means for withdrawing solids from the regenerator and passing the same to the mixing conduit as afore described.

17. A fluid system which comprises reaction means adapted to contain a fluidized mass of finely divided solids, mixing means in open communication with said reaction means such that materials flow from the mixing means to the reaction means, liquid inlet means whereby liquid feed is introduced into said mixing means, transfer means connecting the bottom part of the reactor with the mixing means whereby finely divided solids are transferred from the former to the latter, inlet means for introducing finely divided solids to the mixing means below the point of entry of said liquid feed, stripping means whereby finely divided solids are contacted with a gasiform stripping agent, transfer means whereby finely divided solids are transferred from the reaction means to the said stripping means, regeneration means whereby finely divided solids containing carbonaceous deposits are subjected to an oxidation treatment for the removal of carbonaceous material, cooling means whereby a portion of solids from the regeneration means is cooled to a temperature below that existing in the regeneration means, hopper means whereby cooled solids are received from the cooling means, inlet solids transfer means whereby cooled solids are transferred from the hopper means to the regeneration means, means for transferring solids from said stripping means to the cooled solids transfer means, regenerated solids stripping means whereby the solids from the regeneration means are contacted with a gasiform stripping agent, means for transferring solids from the regeneration means to the regenerated solids stripping means, and means for transferring solids from the regenerated solids stripping means to the mixing means.

References Cited in the file of this patent

UNITED STATES PATENTS

| | | |
|---|---|---|
| 1,940,652 | Semmes | Dec. 19, 1933 |
| 2,345,487 | Liedholm | Mar. 28, 1944 |
| 2,382,755 | Tyson | Aug. 14, 1945 |
| 2,387,798 | Kubicek et al. | Oct. 30, 1945 |
| 2,389,236 | Payne | Nov. 20, 1945 |
| 2,403,375 | Kassel | July 2, 1946 |
| 2,428,914 | Kassel | Oct. 14, 1947 |
| 2,472,844 | Munday et al. | June 14, 1949 |
| 2,502,953 | Jahnig | Apr. 4, 1950 |